(12) United States Patent
Uwazumi et al.

(10) Patent No.: US 8,105,707 B2
(45) Date of Patent: Jan. 31, 2012

(54) PERPENDICULAR MAGNETIC RECORDING MEDIUM

(75) Inventors: Hiroyuki Uwazumi, Yamanashi (JP); Yasushi Sakai, Nagano (JP); Shunji Takenoiri, Yamanashi (JP)

(73) Assignee: Fuji Electric Co., Ltd., Kawasaki-Shi (JP)

( * ) Notice: Subject to any disclaimer, the term of this patent is extended or adjusted under 35 U.S.C. 154(b) by 0 days.

(21) Appl. No.: 12/595,618

(22) PCT Filed: Apr. 11, 2008

(86) PCT No.: PCT/JP2008/057206
§ 371 (c)(1),
(2), (4) Date: Mar. 15, 2010

(87) PCT Pub. No.: WO2008/133060
PCT Pub. Date: Nov. 6, 2008

(65) Prior Publication Data
US 2010/0165509 A1    Jul. 1, 2010

(30) Foreign Application Priority Data

Apr. 13, 2007  (JP) ................................ 2007-106193
Apr. 13, 2007  (JP) ................................ 2007-106194

(51) Int. Cl.
*G11B 5/66*    (2006.01)
(52) U.S. Cl. ................................... 428/831.2
(58) Field of Classification Search ......................... None
See application file for complete search history.

(56) References Cited

U.S. PATENT DOCUMENTS

| | | | |
|---|---|---|---|
| 6,830,807 B2 * | 12/2004 | Okuyama et al. | 428/831 |
| 7,067,206 B2 | 6/2006 | Uwazumi et al. | |
| 2007/0082414 A1 | 4/2007 | Watanabe et al. | |
| 2008/0096055 A1 * | 4/2008 | Takenoiri et al. | 428/831 |

FOREIGN PATENT DOCUMENTS

| | | |
|---|---|---|
| JP | 2001-093139 A | 4/2001 |
| JP | 2001-312815 A | 11/2001 |
| JP | 2003-077122 A | 3/2003 |
| JP | 2003-123245 A | 4/2003 |
| JP | 2004-288348 A | 10/2004 |
| JP | 2004-310910 A | 11/2004 |
| WO | WO-2005/088609 A1 | 9/2005 |
| WO | WO-2005-088609 A1 | 9/2005 |

OTHER PUBLICATIONS

Soichi Oikawa et al., "High performance CoPtCrO single layered perpendicular media with no recording demagnetization", IEEE transactions on magnetics, 2000, vol. 36, No. 5, pp. 2393-2395.

* cited by examiner

*Primary Examiner* — Holly Rickman
(74) *Attorney, Agent, or Firm* — Rabin & Berdo, P.C.

(57) ABSTRACT

A perpendicular magnetic recording medium, which includes a nonmagnetic substrate, and a soft magnetic layer, a first orientation control layer, a nonmagnetic intermediate layer, and a perpendicular magnetic recording layer formed sequentially on the nonmagnetic substrate. The perpendicular magnetic recording medium further includes a second orientation control layer provided between the first orientation control layer and the nonmagnetic intermediate layer. The nonmagnetic intermediate layer has hexagonal close-packed (hcp) structure. The first orientation control layer has a face-centered cubic (fcc) structure. The second orientation control layer includes Co and Cr, and has the hcp structure.

8 Claims, 3 Drawing Sheets

PERPENDICULAR MAGNETIC RECORDING MEDIUM

BACKGROUND OF THE INVENTION

1. Field of the Invention

This invention relates to a perpendicular magnetic recording medium, mounted in an external storage device for a computer or in other various magnetic recording devices.

2. Description of the Related Art

Perpendicular magnetic recording methods are beginning to be commercialized as a technology to achieve high densities in magnetic recording, in place of conventional longitudinal magnetic recording methods.

A perpendicular magnetic recording medium is generally formed by sequentially layering a soft magnetic backing layer, a nonmagnetic intermediate layer, a magnetic recording layer, and a protective layer. As the nonmagnetic intermediate layer, Ru or an alloy containing Ru is used. As the magnetic recording layer, materials having a so-called granular structure, which comprise ferromagnetic crystal grains mainly comprising CoPt alloy having ferromagnetic properties, and nonmagnetic grain boundaries mainly comprising an oxide and surrounding the ferromagnetic crystal grains, are widely used.

For example, a perpendicular recording medium, having a nonmagnetic intermediate layer of Ru and a magnetic recording layer of CoPtCr—O alloy with a so-called granular structure, is described in "High Performance CoPtCrO Single Layered Perpendicular Media with No Recording Demagnetization", Oikawa et al, IEEE Transactions on Magnetics, Vol. 36, No. 5, p. 2393-2395, September 2000. Here, as the film thickness of the Ru which is the nonmagnetic intermediate layer is increased, the c-axis orientation of the CoPtCr—O alloy in the magnetic recording layer is improved, isolation of magnetic crystal grains is promoted, and as a result, excellent magnetic characteristics and electromagnetic transducing characteristics are obtained.

Further, in U.S. Pat. No. 7,067,206, a perpendicular magnetic recording medium is disclosed having, in order, a soft magnetic backing layer, an orientation control layer comprising an alloy with a face-centered cubic (fcc) structure, a nonmagnetic intermediate layer of Ru having a hexagonal close-packed (hcp) structure, and a magnetic recording layer of a CoPtCr—SiO$_2$ alloy having a granular structure. Here, by providing an orientation control layer, further control of the fine structure in the nonmagnetic intermediate layer and magnetic recording layer is possible, so that even more satisfactory electromagnetic transducing characteristics can be realized.

In Japanese Patent Application Laid-open No. 2004-288348, a perpendicular magnetic recording medium is disclosed in which an underlayer comprising a soft magnetic Permalloy material and a soft magnetic Co layer or a soft magnetic Co-base alloy layer are provided between a soft magnetic backing layer and a nonmagnetic intermediate layer comprising Ru or Ru-base alloy. Here, by providing a soft magnetic Co layer or a soft magnetic Co-base alloy layer, the coercivity of the magnetic recording layer is increased, the squareness ratio of the medium is improved, and simultaneously the thickness of the Ru or Ru alloy film serving as the nonmagnetic intermediate layer can be reduced. As a result, media noise is decreased and the SNR is improved.

On the other hand, in Japanese Patent No. 3588039, a perpendicular magnetic recording medium is disclosed in which a nonmagnetic intermediate layer comprising CoCr alloy having a hcp structure is provided between an underlayer film and the perpendicular magnetic film.

Further increases in recording density are sought for magnetic recording media, and whereas the recording density of the first perpendicular magnetic recording media commercialized using the above-described technology was about 140 Gbits/in$^2$, at present recording densities several times this or more are being demanded. To this end, further improvement of electromagnetic transducing characteristics, that is, improvement of the signal-to-noise ratio SNR upon recording and reproduction using magnetic heads, is sought.

In order to improve the SNR, promotion of the magnetic isolation of magnetic crystal grains in the magnetic recording layer (promotion of separation of oxide grain boundaries and alloy crystal grains), finer crystal grain diameters, greater homogeneity, and improvement of c-axis orientation are deemed necessary, and to this end, precise structural control of the nonmagnetic intermediate layer is necessary. In the technology of the prior art disclosed in U.S. Pat. No. 7,067,206 above, an orientation control layer is used for the structural control of the nonmagnetic intermediate layer; but it is becoming difficult to realize higher recording densities by this means alone. And, in the technology of the prior art disclosed in Japanese Patent Application Laid-open No. 2004-288348 above, a Co layer having soft magnetic properties or a Co-base alloy layer having soft magnetic properties is provided between the nonmagnetic intermediate layer and the soft magnetic backing layer, but magnetic recording media in which a soft magnetic Co layer is provided has the problem of poor corrosion resistance (large amounts of Co elution).

SUMMARY OF THE INVENTION

This invention was devised in light of the above problems, and has as an object of providing a perpendicular magnetic recording medium with excellent corrosion resistance and an improved SNR, and enabling still higher recording densities.

As a result of diligent studies on a perpendicular magnetic recording medium to improve the SNR so as to raise recording densities, these inventors clarified that by forming a second orientation control layer between the nonmagnetic intermediate layer, preferably comprising Ru or a Ru alloy and having the hcp structure, and a first orientation control layer having the fcc structure, and by employing as this second orientation control layer an alloy comprising at least Co and Cr and having the hcp structure, a perpendicular magnetic recording medium having a high SNR and excellent corrosion resistance can be realized. In order to closely control the fine structure of the magnetic recording layer via a structural control of the first orientation control layer and the nonmagnetic intermediate layer, it is desirable that the second orientation control layer be in contact with the nonmagnetic intermediate layer and first orientation control layer.

That is, in order to attain the above-described object, a perpendicular magnetic recording medium of this invention, formed by sequentially layering on a nonmagnetic substrate at least a soft magnetic layer, a first orientation control layer, a nonmagnetic intermediate layer, and a perpendicular magnetic recording layer, is characterized in that the first orientation control layer comprises a thin film having a face-centered cubic (fcc) structure, and the nonmagnetic intermediate layer in contact with the perpendicular magnetic recording layer has a hexagonal close-packed (hcp) structure. A second orientation control layer, comprising an alloy containing at least Co and Cr and having the hexagonal close-packed (hcp) structure, is provided between the first orientation control layer and the nonmagnetic intermediate layer. Here, from the standpoint of further improvement of corrosion resistance and maintenance of an excellent SNR, it is desirable that the Cr content of the second orientation control layer be 10 at % or higher and 50 at % or lower.

It is desirable that the second orientation control layer further comprise Mn. From the standpoint of further improvement of the SNR and improvement of the corrosion resistance, it is desirable that the Mn content be 5 at % or higher and 55 at % or lower. In addition, from the standpoint of further improvement of the SNR, it is desirable that the saturation magnetic flux density Bs of the second orientation control layer be 1 T or lower, and preferable 0.5 T or lower, and that the layer be nonmagnetic (with a Bs of 0 T).

From the standpoint of further improvement of the SNR, it is desirable that the nonmagnetic intermediate layer comprise Ru or an alloy containing Ru.

From the standpoint of further improvement of the SNR, it is desirable that the first orientation control layer be a soft magnetic alloy comprising at least Ni and Fe.

From the standpoint of further improvement of the SNR, it is desirable that the perpendicular magnetic recording layer have at least one magnetic layer (granular magnetic layer) comprising ferromagnetic crystal grains mainly comprising a CoPt alloy having ferromagnetic properties, and nonmagnetic grain boundaries mainly comprising an oxide or a nitride and surrounding the ferromagnetic crystal grains.

According to this invention, by forming a second orientation control layer comprising an alloy containing at least Co and Cr and having the hcp structure between a nonmagnetic intermediate layer having the hcp structure and a first orientation control layer having the fcc structure, a perpendicular magnetic recording medium can be realized with excellent corrosion resistance and a high SNR.

DETAILED DESCRIPTION OF THE INVENTION

Figure 1:
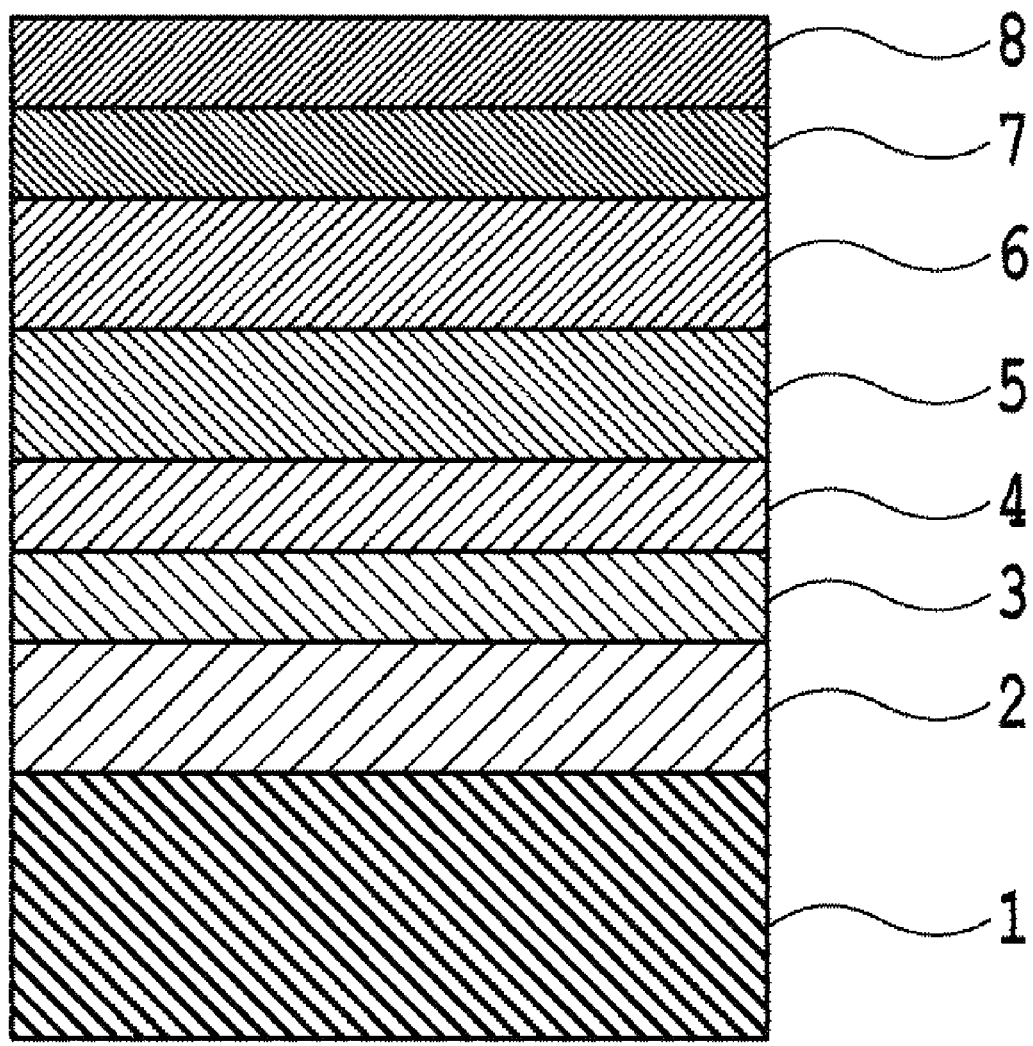
FIG. 1 is a schematic cross-sectional diagram showing the configuration of an aspect of a perpendicular magnetic recording medium of this invention.

Below, a preferred aspect of the invention is explained. FIG. 1 is a schematic cross-sectional diagram showing the configuration of the aspect of a perpendicular magnetic recording medium of this invention. As shown in FIG. 1, the perpendicular magnetic recording medium of the aspect of the invention has a structure in which a soft magnetic layer 2, a first orientation control layer 3, a second orientation control layer 4, a nonmagnetic intermediate layer 5, a magnetic recording layer 6, and a protective layer 7 are sequentially formed on a nonmagnetic substrate 1. On top of this is further formed a liquid lubricant layer 8.

As the nonmagnetic substrate 1, Al alloy with NiP plating, or reinforced glass, crystallized glass, or another material used in normal magnetic recording media, can be used.

As the soft magnetic layer 2, an FeCo alloy, NiFe alloy, or an amorphous Co alloy, or any other soft magnetic material normally used can be suitably employed.

The first orientation control layer 3 must be a metal or an alloy having the face-centered cubic (fcc) crystal structure. Among these, it is desirable that 1) any metal among Cu, Au, Pd, or Pt, 2) an alloy containing at least one among Cu, Au, Pd, Pt, and Ir, or 3) an alloy containing at least Ni and Fe, be used. When a material such as an NiFe alloy having soft magnetic properties is used, structure control of the nonmagnetic intermediate layer 5 is possible without widening the distance between the magnetic recording head and the soft magnetic layer 2, and so it is preferable that the first orientation control layer 3 contains at least Ni and Fe and has soft magnetic properties.

The nonmagnetic intermediate layer 5 must be a metal or an alloy having the hexagonal close-packed (hcp) crystal structure; it is extremely desirable that the intermediate layer 5 be pure Ru or an alloy containing Ru.

It is desirable that the magnetic recording layer 6 be a so-called granular magnetic layer comprising crystal grains having ferromagnetic properties, and nonmagnetic grain boundaries surrounding the crystal grains, and in which the nonmagnetic grain boundaries comprise oxides or nitrides of metals. The granular magnetic layer can be fabricated by for example sputtering of a ferromagnetic metal target comprising oxides forming the nonmagnetic grain boundaries, or by reactive sputtering of a ferromagnetic metal target in Ar gas containing oxygen.

There are no limits in particular on the material forming the crystal grains having ferromagnetic properties, but a CoPt alloy can be advantageously used. In particular, it is desirable that at least one element among Cr, Ni and Ta be added to the CoPt alloy, in order to reduce media noise. On the other hand, as the material forming the nonmagnetic grain boundaries, it is particularly desirable that oxides of at least one element selected from among Cr, Co, Si, Al, Ti, Ta, Hf, and Zr be used, in order to form a stable granular structure. No limits in particular are placed on the thickness of the granular magnetic layer, but a film thickness sufficient to obtain adequate head reproduction output and recording/reproduction resolution at the time of recording and reproduction is necessary.

The perpendicular magnetic recording layer 6 of this invention may further have, in addition to at least one granular magnetic layer, one or a plurality of magnetic layers. That is, by layering onto the above-described granular magnetic layer a CoPt alloy not containing oxides, or the oxide content of which is relatively low, further improvement of the electromagnetic transducing characteristics is possible in some cases, and the advantageous results of this invention are not impaired even when a perpendicular magnetic recording layer 6 having such a layered structure is used.

As the protective layer 7, a thin film mainly comprising carbon, formed for example by a CVD method or a sputtering method, is used.

As the liquid lubricant layer 8, for example a perfluoro polyether lubricant can be used.

Below, the second orientation control layer 4 is explained. The second orientation control layer 4 comprises an alloy containing at least Co and Cr, and must be in contact with the nonmagnetic intermediate layer 5, and also in contact with the first orientation control layer 3, in order to closely control the fine structure of the perpendicular magnetic recording layer 6 via a structural control of the first orientation control layer 3 and nonmagnetic intermediate layer 5.

From the standpoint of improving corrosion resistance and maintaining an excellent SNR, it is desirable that the Cr content of the second orientation control layer 4 be 10 at % or higher and 50 at % or lower. Further, from the standpoint of SNR improvement and corrosion resistance improvement which are objects of the invention, it is desirable that the second orientation control layer 4 comprise Mn, and that the Mn content be 5 at % or higher and 55 at % or lower.

The film thicknesses of the first orientation control layer 3, second orientation control layer 4, and nonmagnetic intermediate layer 5 can be adjusted appropriately in order to achieve the required media characteristics. It is desirable that the film thicknesses of the first and second orientation control layers 3, 4 be 3 nm or greater and 15 nm or less. By using first and second orientation control layers 3, 4 having film thicknesses in this range, the film thickness of the nonmagnetic intermediate layer 5, in cases in which expensive Ru is used, can be reduced to at least 20 nm or less, and preferably 15 nm or less, so that manufacturing costs can be reduced.

EMBODIMENTS

Below, embodiments of the invention, as more specific examples of the above-described aspect, are explained.

Embodiment 1

As the nonmagnetic substrate 1 an Al substrate with NiP plating was used; after washing, the substrate was introduced into a sputtering device. A $Co_{87}Zr_5Nb_8$ target was used in Ar gas at a pressure of 5 mTorr (approximately 0.67 Pa) to form a soft magnetic layer 2, of thickness 100 nm, comprising CoZrNb amorphous alloy. Next, an $Ni_{83}Fe_{12}Cr_5$ target was used in Ar gas at a pressure of 10 mTorr (approximately 1.33 Pa) to form a first orientation control layer 3, of thickness 10 nm, comprising NiFeCr soft magnetic alloy with the fcc structure. Then, a target with the composition shown in Table 1 was used in Ar gas at a pressure of 5 mTorr (approximately 0.67 Pa) to form a second orientation control layer 4, of thickness 10 nm.

After this, a nonmagnetic intermediate layer 5 comprising Ru, of thickness 15 nm and having the hcp structure, was formed in Ar gas at a pressure of 30 mTorr (approximately 4.00 Pa). Then, as a magnetic recording layer 6, a target of $Co_{79}Cr_7Pt_{14}$ with 12 mol % $SiO_2$ added was used to form a CoCrPt—$SiO_2$ granular magnetic layer of thickness 10 nm in Ar gas at a pressure of 30 mTorr (approximately 4.00 Pa), and a $Co_{66}Cr_{20}Pt_{10}B_4$ target was used in Ar gas at a pressure of 5 mTorr (approximately 0.67 Pa) to form a CoCrPtB alloy magnetic layer of thickness 5 nm, and by this means the perpendicular magnetic recording layer 6, with a two-layer structure, was formed. Then, a CVD method was used to deposit a protective layer 7 of thickness 5 nm and mainly comprising carbon, after which the layered member was removed from vacuum. Then, a perfluoro polyether liquid lubricant was applied to form a liquid lubricant layer 8 of thickness 1.5 nm, and in this way a perpendicular magnetic recording medium having the configuration shown in FIG. 1 was fabricated.

The crystal structures of the second orientation control layer 4 and each of the other layers were determined by X-ray diffraction, using as measurement samples the layered member before and after formation of the second orientation control layer and the other layers. The saturation magnetic flux density Bs of the second orientation control layer 4 was calculated using a VSM, using as the measurement sample a single-layer film formed on Al substrate with NiP plating. Electromagnetic transducing characteristics of the perpendicular magnetic recording media were measured using a spinstand tester (manufactured by Guzik Technical Enterprises) and a shielded pole head for perpendicular recording with a write track width of 0.12 µm, comparing the SNR (signal-to-noise ratio) at a recording density of 700 kFCI.

Also, the amount of Co elution after leaving the sample in a high-temperature, high-humidity environment was measured, as an indication of the corrosion resistance of the magnetic recording medium. The amount of Co elusion was measured by placing the perpendicular magnetic recording medium in an 80° C., 85% RH environment for 96 hours, and then immersing for 10 minutes in distilled water, and using an ICP-MS device to measure the amount of eluted Co. The results appear in Table 1.

When the second orientation control layer 4 does not contain Co or Cr, even when the Bs of the second orientation control layer 4 is 0.5 T or less, the SNR of the perpendicular magnetic recording medium is a low value of 10 dB or lower. When the second orientation control layer 4 contains Co but not Cr, and has a Bs of 0.5 T or higher, and in particular a Bs of 1 T or higher, noise arising from the second orientation control layer increases, so that a satisfactory SNR is not obtained. Also, even when the second orientation control layer 4 has a Bs of 1 T or less, if the crystal structure is not the hcp structure, again satisfactory characteristics are not obtained. A sample in which the second orientation control layer 4 was CoNb, with the hcp crystal structure and also a Bs of less than 0.8 T, was not obtained.

It is seen that even when using a second orientation control layer 4 containing at least Co and Cr and having the hcp structure, a lower Bs results in a satisfactory SNR. It is seen that when a still better SNR is desired, the Bs should be reduced to 0.5 T or lower. A satisfactory SNR is obtained when Cr is added until the Bs reaches 0 T (that is, until the second orientation control layer 4 becomes nonmagnetic).

Hence, as the second orientation control layer 4, an alloy thin film must be used containing at least Co and Cr and having the hcp structure, and preferably having a Bs of 1 T or lower, and more preferably still of 0.5 T or lower. It is still more preferable that the Bs be 0 T (that is, nonmagnetic). It is seen that by adding Mn to a second orientation control layer 4 containing Co and Cr, a better SNR is obtained than when Mn is not added.

On the other hand, it is seen that there is a tendency for the amount of Co elution, indicating a lack of corrosion resistance, to increase with decreasing amount of Cr added, and to increase with the addition of Mn.

Embodiment 2

As the nonmagnetic substrate 1, a disc-shape reinforced glass substrate (N5 substrate manufactured by HOYA), with a nominal diameter of 2.5 inches, was used, and after cleaning was introduced into a sputtering device. A $Co_{85}Zr_{10}Nb_5$ target was used in Ar gas at a pressure of 5 mTorr (approximately 0.67 Pa) to form a soft magnetic layer 2 of thickness 80 nm comprising a CoZrNb amorphous alloy. Next, an $Ni_{83}Fe_{12}Cr_5$ target was used in Ar gas at a pressure of 10 mTorr (approximately 1.33 Pa) to form the first orientation control layer 3, comprising fcc structure NiFeCr soft magnetic alloy, with a thickness of 10 nm. Then, a target with a composition shown in Table 2 was used in Ar gas at a pressure of 5 mTorr (approximately 0.67 Pa) to form the second orientation control layer 4 of thickness 10 nm.

Then, the nonmagnetic intermediate layer 5, comprising hcp structure Ru, was formed in Ar gas at a pressure of 30 mTorr (approximately 4.00 Pa), to a thickness of 15 nm. Next, as the magnetic recording layer 6, a target of $Co_{76}Cr_{12}Pt_{12}$ with 7 mol % $SiO_2$ added was used to form a CoCrPt—$SiO_2$ granular magnetic layer of thickness 10 nm in Ar gas at a pressure of 30 mTorr (approximately 4.00 Pa), and a $Co_{66}Cr_{20}Pt_{10}B_4$ target was used to form a CoCrPtB alloy magnetic layer of thickness 5 nm in Ar gas at a pressure of 5 mTorr (approximately 0.67 Pa); by this means, a magnetic recording layer 6 with a two-layer structure was formed. Then, a CVD method was used to deposit the protective layer 7, mainly comprising carbon, with a film thickness of 5 nm, after which the layered member was removed from vacuum. Then, a perfluoro polyether liquid lubricant was applied to form a liquid lubricant layer 8 of thickness 1.5 nm, and in this way a perpendicular magnetic recording medium having the configuration shown in FIG. 1 was fabricated. No substrate heating was performed prior to film deposition.

Table 2 shows the relation between the composition of the target used in deposition of the second orientation control layer 4, and the SNR and Co elution amount.

Figure 2:
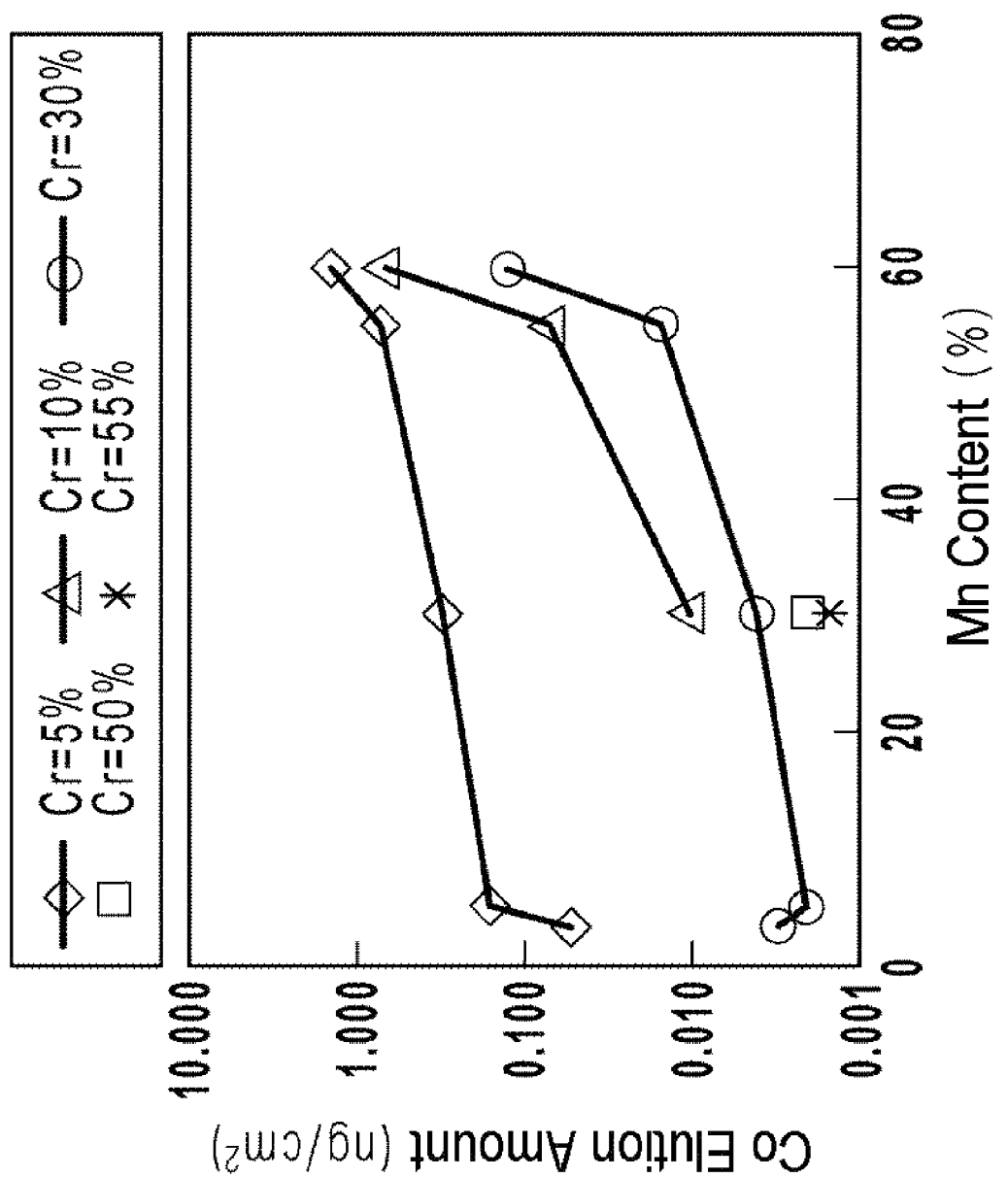
FIG. 2 shows the dependence on amount of Mn added of the SNR of a medium of an embodiment, with the Cr addition amount as a parameter.
Figure 3:
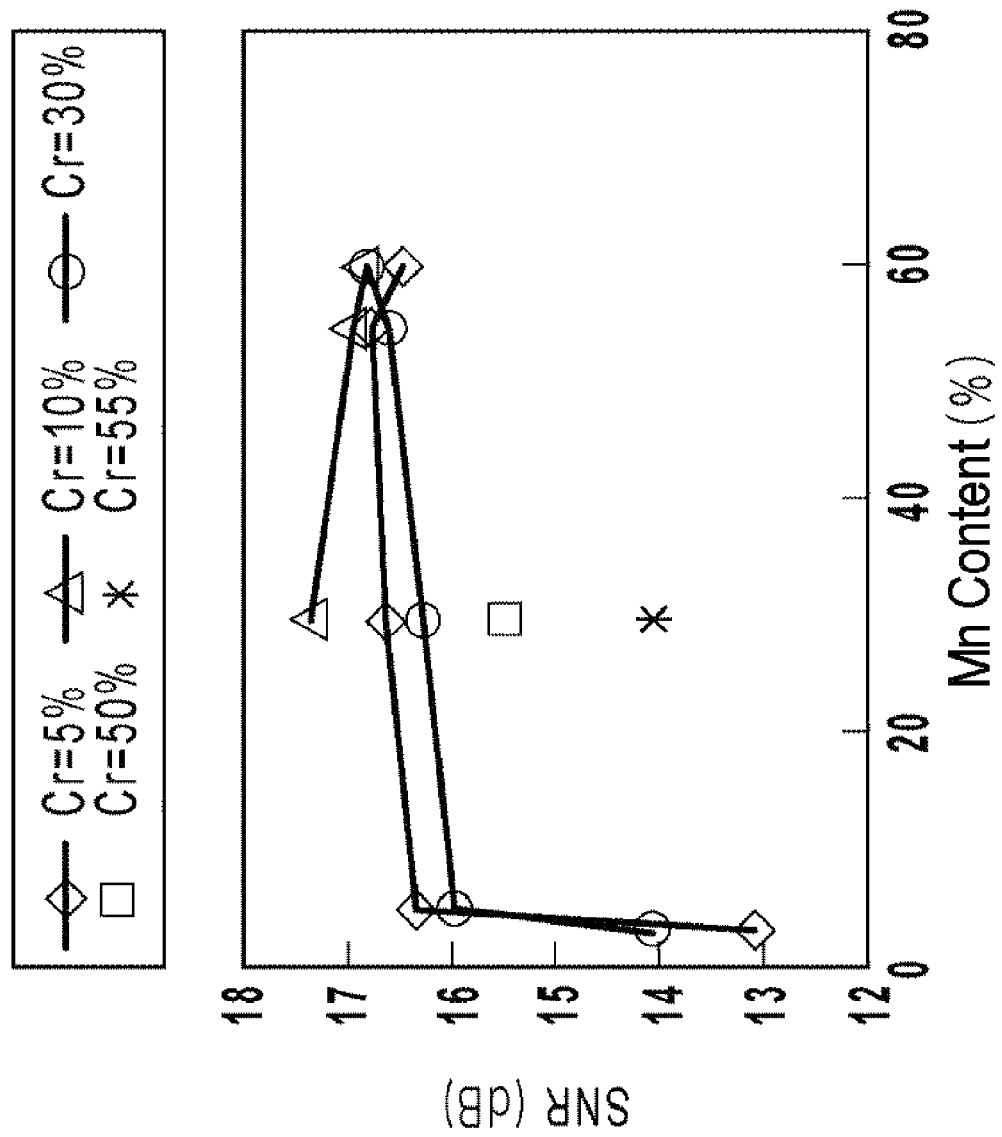
FIG. 3 shows the dependence on amount of Mn added of the Co elution amount from a medium of an embodiment, placed in a high-temperature, high-humidity environment, with the Cr addition amount as a parameter.

In FIG. 2 and FIG. 3, the dependence on the amount of Mn addition of the SNR and the Co elution amount are respectively shown, with the Cr addition amount as a parameter.

From FIG. 2, it is seen that the SNR is improved by adding 5 at % or more Mn. That is, whereas the SNR is 14 dB or lower when the Mn addition amount is 3 at %, upon adding 5 at % or more the SNR is 15 dB or higher. Also, when the Cr content is increased from 30 at %, the SNR tends to decline, and when the Cr content is 55 at %, the SNR has worsened to approximately 14 dB.

Hence it is seen that addition of 5 at % or more Mn, and keeping the Cr addition amount to 50 at % or lower, is desirable to raise the recording density.

On the other hand, from FIG. 3 it is seen that the Co elution amount, which indicates corrosion resistance, tends to increase with an increasing Mn addition amount and with a decreasing Cr addition amount. In order for magnetic recording media to be judged corrosion-resistant, it is necessary that the Co elution amount be 0.1 ng/cm$^2$ or less. From this standpoint, it is seen that a Cr addition amount of 10 at % or higher is desirable, and that an Mn addition amount of 55 at % or lower is desirable.

TABLE 1

| | Composition of second orientation control layer | Target composition for second orientation control layer | Crystal structure of second orientation control layer | Saturation flux density of second orientation control layer Bs (T) | Media characteristics Transducing characteristics SNR (dB) | Media characteristics Corrosion resistance Co elution amount (ng/cm$^2$) |
|---|---|---|---|---|---|---|
| Embodiment 1-1 | CoCr | $Co_{79}Cr_{21}$ | hcp | 0.3 | 11.7 | 0.018 |
| Embodiment 1-2 | CoCr | $Co_{62}Cr_{38}$ | hcp | 0 | 12.0 | 0.002 |
| Embodiment 1-3 | CoCr | $Co_{83}Cr_{17}$ | hcp | 0.6 | 10.9 | 0.075 |
| Embodiment 1-4 | CoCrMn | $Co_{73}Cr_{17}Mn_{10}$ | hcp | 0.2 | 12.4 | 0.091 |
| Ref. Example 1 | Cu | Cu | fcc | 0 | 7.3 | 0.003 |
| Ref. Example 2 | FeCoN | $Fe_{55}Co_{35}N_{10}$ | fcc | 1.8 | 9.2 | 0.133 |
| Ref. Example 3 | CoZrNb | $Co_{83}Zr_7Nb_{10}$ | amorphous | 0.9 | 8.7 | 1.176 |
| Ref. Example 4 | FeAl | $Fe_{83}Al_{17}$ | bcc | 0.7 | 9.5 | 0.553 |
| Ref. Example 5 | CoNb | $Co_{85}Nb_{15}$ | hcp | 0.95 | 10.7 | 0.211 |
| Ref. Example 6 | CoNb | $Co_{83}Nb_{17}$ | amorphous | 0.8 | 9.0 | 0.955 |
| Ref. Example 7 | none | — | — | — | 10.2 | 0.858 |

TABLE 2

| | Target composition amount Co at % | Target composition amount Cr at % | Target composition amount Mn at % | Media characteristics Transducing characteristics SNR (dB) | Media characteristics Corrosion resistance Co elution amount (ng/cm$^2$) |
|---|---|---|---|---|---|
| Embodiment 2-1 | 92 | 5 | 3 | 13.1 | 0.051 |
| Embodiment 2-2 | 90 | 5 | 5 | 16.3 | 0.151 |
| Embodiment 2-3 | 65 | 5 | 30 | 16.6 | 0.309 |
| Embodiment 2-4 | 40 | 5 | 55 | 16.8 | 0.717 |
| Embodiment 2-5 | 35 | 5 | 60 | 16.5 | 1.449 |
| Embodiment 2-6 | 60 | 10 | 30 | 17.4 | 0.011 |
| Embodiment 2-7 | 35 | 10 | 55 | 17.0 | 0.076 |
| Embodiment 2-8 | 30 | 10 | 60 | 16.9 | 0.731 |
| Embodiment 2-9 | 67 | 30 | 3 | 14.1 | 0.003 |
| Embodiment 2-10 | 65 | 30 | 5 | 16.0 | 0.002 |
| Embodiment 2-11 | 40 | 30 | 30 | 16.3 | 0.004 |
| Embodiment 2-12 | 15 | 30 | 55 | 16.6 | 0.015 |
| Embodiment 2-13 | 10 | 30 | 60 | 16.8 | 0.128 |
| Embodiment 2-14 | 20 | 50 | 30 | 15.5 | 0.002 |
| Embodiment 2-15 | 15 | 55 | 30 | 14.1 | 0.002 |

The invention claimed is:

1. A perpendicular magnetic recording medium, comprising:
   a nonmagnetic substrate;
   a soft magnetic layer, a first orientation control layer, a nonmagnetic intermediate layer, and a perpendicular magnetic recording layer formed sequentially on the nonmagnetic substrate, the nonmagnetic intermediate layer consisting of Ru or an alloy containing Ru and having a hexagonal close-packed (hcp) structure, the first orientation control layer having a face-centered cubic (fcc) structure; and
   a second orientation control layer formed between the first orientation control layer and the nonmagnetic intermediate layer, the second orientation control layer including Co, Cr and Mn, and having the hexagonal close-packed (hcp) structure.

2. The perpendicular magnetic recording medium according to claim 1, wherein the second orientation control layer has a Cr content in the range of 10 at % to 50 at %, and has a Mn content in the range of 5 at % to 55 at %.

3. The perpendicular magnetic recording medium according to claim 1, wherein the second orientation control layer has a saturation magnetic flux density Bs that is no more than 1 T.

4. The perpendicular magnetic recording medium according to claim 1, wherein the second orientation control layer has a saturation magnetic flux density Bs that is no more than 0.5 T.

5. The perpendicular magnetic recording medium according to claim 1, wherein the second orientation control layer is nonmagnetic.

6. The perpendicular magnetic recording medium according to claim 1, wherein the first orientation control layer is an alloy containing at least Ni and Fe.

7. The perpendicular magnetic recording medium according to claim 6, wherein the first orientation control layer has soft magnetic properties.

8. The perpendicular magnetic recording medium according to claim 1, wherein the perpendicular magnetic layer has a granular magnetic layer including ferromagnetic crystal grains and nonmagnetic grain boundaries surrounding the ferromagnetic crystal grains, the ferromagnetic crystal grains including a CoPt alloy and having ferromagnetic properties, the nonmagnetic grain boundaries including an oxide or a nitride.

* * * * *